S. W. Odell,
Tag.
No. 94,334.      Patented Aug. 31, 1869.
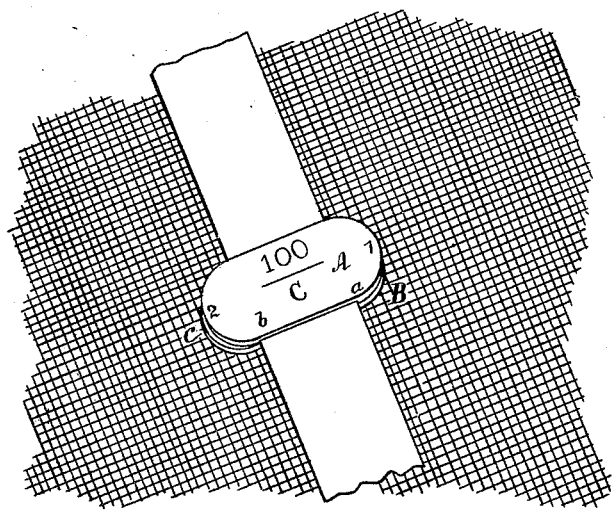
Fig. 1.
Fig. 2.
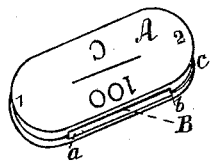
Witnesses:      Inventor:

United States Patent Office.

S. W. ODELL, OF OUACHITA PARISH, ASSIGNOR TO HIMSELF AND JOHN NIXON, OF NEW ORLEANS, LOUISIANA.

Letters Patent No. 94,334, dated August 31, 1869.

IMPROVEMENT IN COTTON-CHECKS.

The Schedule referred to in these Letters Patent and making part of the same

*To all whom it may concern:*

Be it known that I, S. W. ODELL, of the parish of Ouachita, and State of Louisiana, have invented a certain new and useful device, which I designate by the name of Cotton-Check or Marking-Tag; and I do hereby declare the following to be a full, clear, and exact description of the same, reference being had to the annexed drawing, making a part of this specification.

It is familiar knowledge to all persons who are engaged in the culture of cotton, as well as in the cotton trade, that in consequence of the extreme facility with which the marks on cotton bales may be erased and others substituted in their place, neither the planter, the shipper, nor the party who stores his cotton in a warehouse, or places it in a cotton-press for compression, has the slightest security against the substitution of an equal number of bales of inferior cotton for his own; for, to make such an exchange, it is only necessary to obliterate the marks, now always made with ordinary marking-ink, or to change the bagging, and put the same number of bales in the place of said cotton, and the same marks on these bales. It is, furthermore, well known that this game of fraud is practised in an extensive manner throughout all the cotton regions of the United States, on the steamboats on which the cotton is transported from the plantations to the shipping ports, in the warehouses and cotton-presses in these ports, and even on shipboard after it has left the same.

To put a stop to this extended system of fraud, it is necessary to abandon the mode of marking cotton that is at present pursued, and to substitute for it a totally different mode, and one which will make it extremely difficult, if not impossible, to remove the marks from a bale, and totally impossible to substitute another mark in its stead. Under these conditions only can fraudulent exchanges be prevented, and every man be secured in the possession of his own cotton.

My invention fulfils both of these conditions, and, moreover, provides a mark which can be used an indefinite number of times, and it therefore cheapens the operation of marking to such an extent as to reduce the expense of the same to a merely nominal figure.

It consists of a metallic spring-check, that is so constructed that it can be attached securely to one of the bands around the bale, and in such manner as to present no portion of it sufficiently above the surface of the bale to catch against any other bale or objects, and thus be torn off. It is, furthermore, so constructed, that if the band to which it is attached be broken off the bale, it can instantly be put on another in the same secure and out-of-the-way manner, as upon the first or broken band.

But my invention will be better understood by referring to the drawing, on which it is shown, at fig. 1, in connection with a section of a band, on which it has been placed as when in actual use, and at fig. 2, as when detached or separate from a band.

On the drawing—

A marks the device as a whole, in one of the simplest forms in which it can be made, but obviously its external configuration may be varied indefinitely. It may be made circular, or nearly so, or of elliptical form, or oblong, or perfectly square, with or without the corners cut off or rounded, or of any other external shape that taste or fancy may dictate.

Through the check, as shown, is an opening, B, (just wide and deep enough to receive a band, as shown at fig. 1,) which terminates on each of its sides by shoulders $a$ $b$.

From the shoulder $a$ to the proximate extremity 1 of the device, there is no opening, the metal being solid, or if the device be made of two parts or sections, these parts are strongly riveted together, so as, in effect, to be solid.

From the shoulder $b$, however, to the extremity 2, there is a cleft, $c$, of a tapering form, as shown, to facilitate the operation of putting the check on a band. This may be done before the band is applied to the bale or afterwards. In the latter case it is driven or forced on the band by a hammer or other equivalent means, and hence it is necessary, in order to prevent any obstruction from the bagging, or the tearing of the latter, to round the point 2 on both of its extremal sides, to a slight degree, as shown at 3 3'.

To provide for the easy transportation of the device in lots, and in some cases to adapt it to other than the special use for which it is designed, I may make a small hole through it, between the shoulder $a$ and the end 1, through which a wire may be passed.

On opposite sides of the opening B and cleft $c$ communicating therewith, the device consists of two jaws, C C', and insomuch as these jaws must yield in a slight degree when the check is put on a band, after the latter has been secured on a bale, it is obvious that some measure of elasticity must obtain in the metal of which the device is made. I propose accordingly to make the device of steel or wrought-iron, so tempered that the jaws C C' will possess the capability of resuming their normal position after they have been forced apart to get the device on the band.

On one side of the check a number is stamped, say up to one hundred thousand or upward, in numerals only. Then another equal number, from 1 to the highest limit, and the letter A, then an additional equal number, with numbers and the letter B, and so through the entire alphabet. If this does not supply the demand, the letters of the alphabet may be duplicated, or even triplicated, in connection with the same numbers.

The object of having a portion stamped with numerals only, is to have a stock on hand for supplying parties who may loose their checks or any part thereof, with the missing numbers, it being only requisite in that case to put on the proper letter or letters.

Two sets of checks may be used, one by the planter, and the other by the shipper to a foreign or Northern port; but there is obviously no need that this should be done.

The mode in which my invention is applied to use has been already sufficiently indicated, and hence I need only further say that it makes the substitution of one lot of cotton for another by dishonest agents, practically impossible, because cotton would be shipped by the number on the check, which could not be counterfeited, and not in the name of the parties shipping it, while at the same time it can be manufactured at less cost than is involved in the present plan or method of marking cotton, when the labor, cost of ink, brushes, &c., are taken into account, so that there is economy in its use, even though no one check is used more than once.

Having thus described my invention,

What I claim, and desire to secure by Letters Patent, as a new article of manufacture, is—

The metallic spring-check A, when constructed and stamped with numbers alone, or with numbers and letters, substantially as herein described, for the purpose set forth.

S. W. ODELL.

Witnesses:
L. W. SURGHNOR,
H. G. DOBSON.